May 30, 1967  KAZUO ISHIKAWA ETAL  3,322,988
DIRECT CURRENT ARMATURE WITH CONDENSERS
Filed Dec. 23, 1964  3 Sheets-Sheet 1
FIG. 1(A)
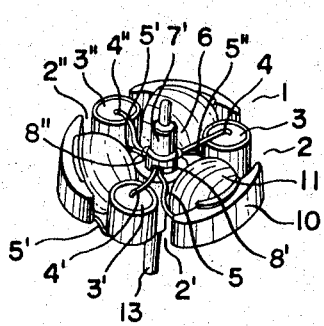
FIG. 1(B)
FIG. 1(C)
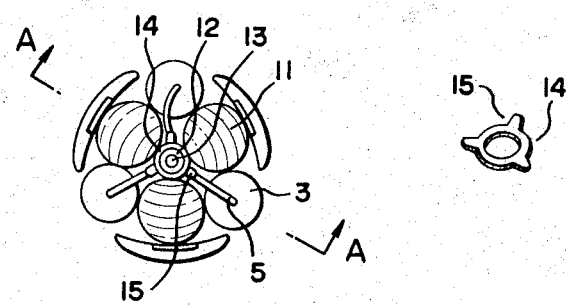
FIG. 1(B')
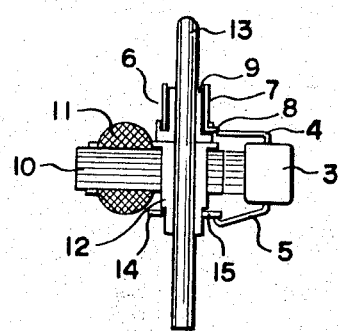
FIG. 1(D)
FIG. 1(C')
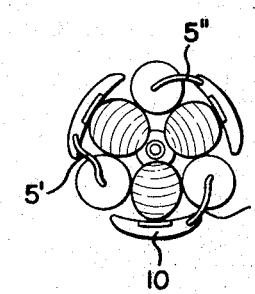
FIG. 1(E)
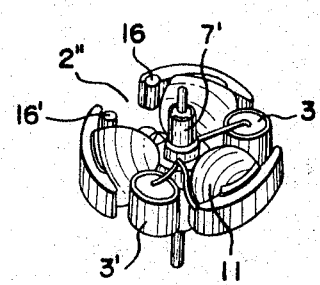
FIG. 2(A)
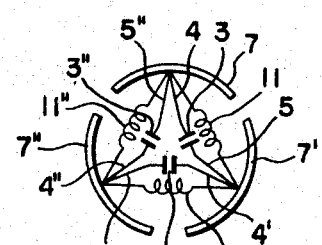

FIG. 2(A')
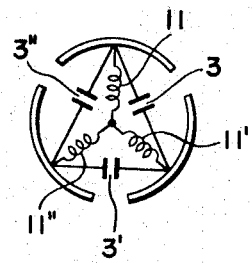
FIG. 2(B)
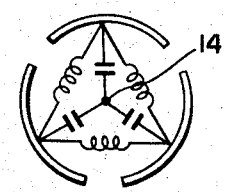
FIG. 2(C)
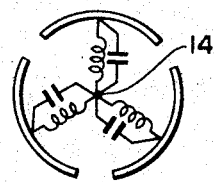
FIG. 2(D)
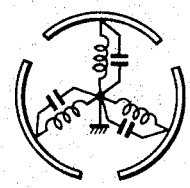
FIG. 3
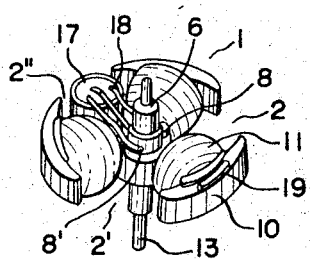
FIG. 2(E)
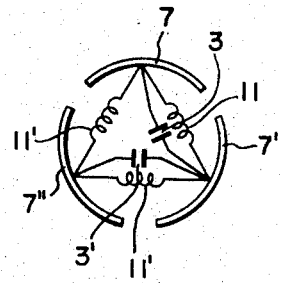

May 30, 1967 KAZUO ISHIKAWA ETAL 3,322,988
DIRECT CURRENT ARMATURE WITH CONDENSERS
Filed Dec. 23, 1964
3 Sheets-Sheet 3

United States Patent Office 3,322,988
Patented May 30, 1967

3,322,988
DIRECT CURRENT ARMATURE WITH CONDENSERS
Kazuo Ishikawa and Yoshio Namiki, Kohoku-ku, Yokohama, and Toshisato Koyamada, Tokyo, Japan, assignors to Jeco Company, Limited, Tokyo, Japan, a corporation of Japan
Filed Dec. 23, 1964, Ser. No. 420,493
Claims priority, application Japan, Dec. 25, 1963, 38/96,543
3 Claims. (Cl. 310—220)

This invention relates to direct current electric motor armatures containing condensers.

A direct current electric motor always performs what is called a commutating action with a brush and commutator. In the case of such commutation, sparks may be produced between the brush and commutator. Such sparks may generate such high temperature and voltage that the brush and commutator will melt and at the same time strong electric noises will occur. Thus the brush and commutator would be deformed, cut or short-circuited to make the rotation of the direct current motor impossible or to give obstruction to the neighboring electric instruments with a high frequency noise current.

In order to eliminate such undesired conditions, a metal which is proof against high temperatures and is high in conductivity is required to prevent the break-down of the brush and commutator in the conventional direct current motor.

In a large direct current motor the brush is handled as a part to be consumed and carbon is used to be added in turn. However, in a small motor the motor itself is a part to be consumed, therefore such addition as is mentioned above is impossible and therefore the design of the brush and commutator is considered to be most important. Further, in some small direct current motors a resistance element is inserted between the commutators in order to prevent sparks. However, in such case, the commutator pieces may be connected with each other through the resistance body, with the result that not only the spark currents but also the effective current flows through the winding of the motor may short-circuit the same and flow through the resistance body between the commutator pieces. Therefore, the efficiency of the electric motor is greatly reduced.

If a condenser is used instead of the resistance, only spark currents will be passed but no effective current will be passed and thus a direct current motor in which no spark will be produced and the efficiency will not reduce will be obtained.

Especially, with a view to preventing high frequency noise currents, it is already practiced to insert a condenser or a filter containing a condenser between a direct current motor and an electric current source or between the terminals of the motor. In such case, a noise current coming out through the lead wire will be eliminated but the spark produced between the brush and commutator will not be directly eliminated. Therefore, the break of the brush and commutator and the noise waves radiating from the motor itself will not be prevented.

From these facts, it can be recognized to be good to set a condenser directly in the armature of an electric motor. But, in the present invention, there is a further feature that there is utilized a conventional condenser or general utility, i.e., this condenser need not be designed specifically for such purpose.

That is to say, the present invention provides a direct current armature wherein a condenser for general use is inserted into a space between windings, and its lead wire is connected to the terminal of a commutator so that any adjacent commutator pieces may be always connected with each other through a capacity.

It is theoretically the best to connect the brush and commutator directly with each other through a capacity. However, as the brush is fixed and the commutator rotates, this is not easy. However, if the capacity is set between the adjacent commutator pieces, the net effect is the same as though the capacity were set between the brush and the commutator. That is to say, when the brush separates from any commutator piece A (a spark may be produced and), the brush will be already in contact with the next commutator piece B. In such case, the brush and the commutator piece B will be of the same electric potential and therefore the commutator piece A and the brush will be connected and each other through the capacity. Therefore, any spark will be absorbed by the capacity.

A principal object of the present invention is to provide a direct current electric motor which is cheap in price, entails few troubles in production, has no deterioration of the brush and commutator by sparks, is stable for a long period and is high in output (so that a large current may be made to flow), by inserting a general condenser in the space between the windings of an armature, using as few condensers as possible and connecting the lead wire of such condenser to the terminal of a commutator attached to the armature.

Another object of the present invention is to provide a direct current electric motor wherein no high frequency electric noise will be produced by sparks.

An embodiment of a three-pole armature in a small field magnet type direct current motor in which the present invention is especially effective shall be explained in the following. Such direct current motors are extensively utilized in such portable electric instruments using dry cells or storage batteries as tape recorders, record players, auto-tuning radios, shavers, cine-cameras, cleaners, pencil sharpeners and electric equipment for automobiles.

In the appended drawing,

FIGURE 1(A) is a perspective view of an embodiment of the present invention wherein three condensers are inserted in a three-pole armature and are connected in the form of a Δ (delta) to commutator pieces.

FIGURE 1(B) is a bottom view of an embodiment of the same wherein the condensers are connected in the form of Y (star) to the commutator pieces.

FIGURE 1(B') is a cross-sectional view on line A–A' in FIGURE 1(B).

FIGURES 1(C) and 1(C') are perspective views of center terminals to be used in the above embodiments.

FIGURE 1(D) is a bottom view of an embodiment wherein the condensers in the above embodiment are connected directly to the iron core of the armature.

FIGURE 1(E) is a perspective view of an embodiment wherein two condensers are inserted in a three-pole armature and are connected in the form of V to the commutator pieces.

FIGURE 2(A) is a wiring diagram of the embodiment in FIGURE 1(A) wherein the windings are connected in the form of a Δ.

FIGURES 2(A') is a wiring diagram of the same wherein the windings are connected in the form of Y.

FIGURES 2(B) is a wiring diagram of the embodiment in FIGURE 1(B) wherein the windings are connected in the form of a Δ.

FIGURE 2(C) is a wiring diagram of the same wherein the windings are connected in the form of Y.

FIGURE 2(D) is a wiring diagram of the embodiment in FIGURE 1(D).

FIGURE 2(E) is a wiring diagram of the embodiment in FIGURE 1(E).

FIGURE 3 is a perspective view of another embodiment of the present invention wherein one combined block condenser is inserted in an armature.

Figure 4A:
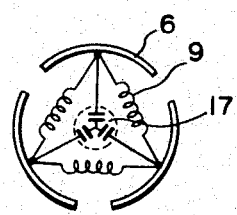
Figure 4B:
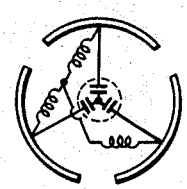
Figure 4C:
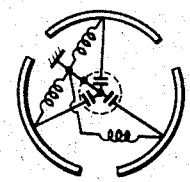

FIGURE 4 is a wiring diagram of the above embodiment, (A) relating to the case in which the windings are connected in the form of a Δ, (B) to the case wherein the windings are connected in the form of Y and (C) to the case in which a block condenser is earthed at the center point to the condenser case, the case and the center point of the Y connection of the windings being earthed to the armature.

Figure 5:
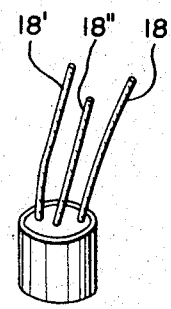

FIGURE 5 is a perspective view of a block condenser.

Figure 6:
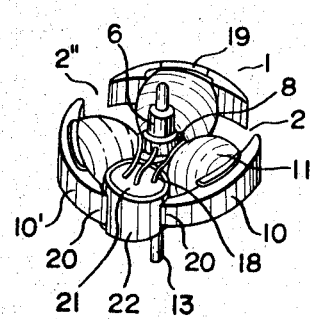

FIGURE 6 is a perspective view of an embodiment wherein the block condenser in the above embodiment is fitted to the iron core of the armature.

Figure 7:
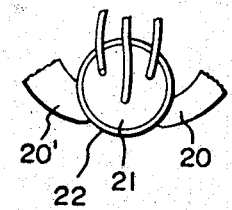

FIGURE 7 is an enlarged plan view of a part of FIGURE 6.

Figure 8:
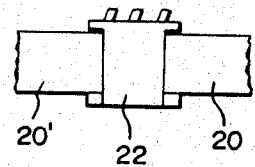

FIGURE 8 is a side view of FIGURE 7.

Figure 9:
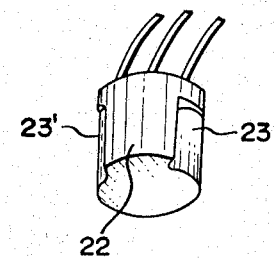

FIGURE 9 is a lower perspective view of the block condenser in the above embodiment.

The present invention shall now be explained with reference to the accompanying drawings. In the drawings, 1 is a direct current armature, 2, 2' and 2" are its iron core spaces and 3, 3' and 3" are condensers contained in said iron core spaces 2, 2' and 2", respectively, 4, 5, 4', 5', 4" and 5" are terminal wires of the respective condensers. 6 is a commutator. 7, 7' and 7" are commutator pieces. 8, 8' and 8" are commutator terminals to which the terminal wires of said condensers are connected in the forms of Y, Δ or V, respectively. 9 is a commutator insulator. 10 is an iron core. 11 is a winding. 12 is an iron core body. 13 is a shaft.

Then, for example, in the wiring in FIGURE 2(A), any spark produced between the commutator pieces 7 and 7' by the electric current flowing through the windings 11, 11' and 11" will be absorbed by the capacity of the condenser 3. The same thing will occur also between the other commutator pieces. In the wiring in FIGURE 2(A'), the spark produced by the current flowing through the windings 11 and 11' will be absorbed by the capacity of the condenser 3. The above is an embodiment wherein the condensers are connected in the form of a Δ. Also in the embodiments in FIGURES 2(B) and 2(C) wherein the condensers are connected in the form of Y, any spark produced between the commutators will be absorbed by the capacity in the same manner. Just in this case, as the condensers are connected in series between the commutator pieces, the capacity will become half. However, at the same time, the voltage applied to the condenser will also become half. Therefore, condensers for low voltages are used. This is advantageous to the case of utilizing electrolytic condensers, because, as the size of the electrolytic condenser is determined by its working voltage, if the working voltage is reduced the size can be made smaller with the same capacity and the condenser will be easier to insert into the space of the armature. In general cases including the case of the above mentioned delta-connection, the electrolytic condenser will be a little higher in cost but will be smaller in size as compared with a large capacity and therefore an electrolytic condenser will be most advantageous.

In order to connect the condensers in the form of Y, it is necessary to hold the wirings at the center point. Therefore, as seen in FIGURES 1(B) and 1(B'), such center terminal plate 14 as is illustrated in FIGURE 1(C) is fixed to the iron core body 12, and the terminal wires 5, 5' and 5" of the condenser are connected to the terminals 15 of the plate 14 for the condensers. If the windings are also connected in the form of Y as in FIGURE 2(B'), a terminal 15' for windings may be further attached to the center terminal plate 14 as in FIGURE 1(C'). As the above mentioned iron core body 12 is generally made of an insulative resin, the center point of the windings will be insulated from the shaft 13 and iron cores 10. If the iron core body 12 is made of such metal as brass, the center point of the windings will be earthed to the shaft 13 and iron cores 10 as in FIGURE 2(D). In order to earth the center point, it is convenient to connect the terminal wires 5, 5' and 5" of the condensers directly to the iron cores 10 as in FIGURE 1(D). In such case, the iron cores 10 should be of such material as can be easily soldered or welded to the terminal wires of the condensers. In such case as the above mentioned embodiment, the metallic case of the direct current motor will be in electric contact with the shaft 13 through a bearing (not illustrated). Therefore, in the case of using the motor in such an acoustic instrument as, for example, a tape recorder or record player, if the case of the motor is fixed directly to the chassis of the above mentioned instrument, the wiring center point of the above mentioned condensers will be earthed to the chassis and therefore electric noises will be eliminated. Thus this embodiment is especially effective to the above mentioned acoustic instruments. The noise waves by sparks will be shielded by the above mentioned metallic case and therefore will not come out.

When one condenser is removed and the remaining two are used, there will occur a V-connection such as is illustrated in FIGURE 2(E). Then, if the capacity of the condenser is $C\mu F$, the capacity between the commutator pieces 7 and 7' and that between 7' and 7" will be $C\mu F$ but that between 7 and 7" will be ½ $C\mu F$. However, even if the capacity is half, it will be within the range of ⅓ of a rotation and therefore the effect of preventing sparks between the commutator and brush will not be unduly reduced. Further, if at least $C\mu F$ is required in order to prevent sparks, as the capacity between the commutator pieces 7 and 7" will be made $C\mu F$, the capacity of the condenser will be 2 $C\mu F$. In such case, the capacity will become twice as large and the volume will somewhat increase but the price of the condenser will not vary so much and will rather become lower than that of any conventional one.

In case the armature must be balanced, a weight equivalent to the weight of the condenser may be set in or around the space 2" containing no condenser. In the embodiment illustrated in FIGURE 1(E), two weights 16 and 16' are set in the space 2".

The explanation has been made of the case of the delta-connection of the windings. But the case of the Y-connection of the windings is also the same as in the case of three condensers. Further, even if the number of poles is 5 or 7, it will be the same that one condenser can be saved.

FIGURES 3 to 5 show another embodiment. In the drawings, 1 is a direct current armature, 2, 2' and 2" are iron core spaces, 17 is a block condenser inserted in said space 2" and 18, 18' and 18" are condenser terminal wires wired directly to the commutator terminals 8, 8' and 8" of the commutator 6, respectively. 10 is an iron core. 11 is a winding. 13 is a shaft. 19 is a balance weight. In case the weight of the condenser 17 is so much lighter than the weight of the entire armature 1 that the balance is hardly a problem, the balance weight 19 need not be attached. The balance weight 19 may be provided at any convenient place opposite the condenser 3.

The wiring between the condenser and commutator is shown in FIGURE 4. There the condensers are shown as Y-connected so as to be shown equivalently. If the capacity between the respective terminals is such as is required, any internal structure will do. In (A) in FIGURE 4, the windings of the armature are delta-connected. But, such Y-connection as in (B) is equivalent. Further, a wiring diagram wherein the case of the condenser is made of metal for earth and the case and the center point of the Y-connection of the windings are both earthed to the iron core is shown in (C) in FIGURE 4. Each of these embodiments has been explained as of the case of three poles. However, the same explanation applies to such multipolar armature as of 5 or 7 poles.

Further, in this embodiment, the block condenser is set in one place in the space of the iron cores, has its terminals directly connected to the respective commutators and is therefore easy to manufacture. As the condensers are grouped into one block, they can be made cheaply.

FIGURES 6 to 9 show still another embodiment. In the drawings, 1 is a direct current armature, 2 is an iron core space and 21 is a block condenser. The case 22 of the condenser 21 is held between the edge parts 20 and 20' of iron cores 10 and 10', respectively, so that the condenser 21 may be supported between the iron cores 10 and 10'. 18 is a condenser terminal wire connected directly to the commutator terminal 8 of the commutator 6. 11 is a winding. 13 is a shaft. 19 is a weight. The case 22 of the block condenser has two concave parts 23 annd 23' in which the edge parts of the respective iron cores are fitted to support the condenser. Further, the concave parts 23 and 23' have respective stopper shoulders in the upper parts so that the upper surfaces of the edge parts 20 and 20' of the iron cores may come respectively into contact with said shoulders to define the vertical position of the block condenser 21. In fitting the block condenser 21 between the edge parts 20 and 20' of the iron cores, it is the best to press in the block condenser. But, in case it is to be loosely fitted in, an adhesive may be used. In the above mentioned embodiment, the case of the block condenser is fitted between the edge parts of the iron cores and is inserted in the iron core space so that the manufacture may be very easy.

What is claimed is:

1. A direct current armature with a condenser comprising a shaft;
    spaced radial cores arranged around said shaft providing respective core gaps therebetween;
    winding coils wound on each of said cores;
    a commutator secured to said shaft;
    a plurality of segments forming said commutator;
    at least one condenser arranged in at least one of said core gaps;
    said condenser being fixed to an armature and having lead wires, and
    the lead wires of said condenser being respectively connected to said segments.

2. A direct current armature with a condenser according to claim 1, wherein two receses made in the case of the condenser are fitted to the tips of the cores and are fixed.

3. A direct current armature with a condenser comprising a shaft;
    spaced radial cores arranged around said shaft providing respective core gaps therebetween;
    winding coils wound on each of said cores;
    a commutator secured to said shaft;
    a plurality of segments forming said commutator;
    a condenser arranged in one of said core gaps;
    said condenser being fixed to an armature and having lead wires, and
    the lead wires of said condenser being equal in number to said segments and being respectively connected to said segments.

References Cited

UNITED STATES PATENTS

| 269,605 | 12/1882 | Thomson | 310—225 |
| 2,178,945 | 11/1939 | Whitby | 310—220 |
| 2,800,598 | 7/1957 | Whitcroft | 310—220 |

FOREIGN PATENTS

| 439,858 | 9/1934 | Great Britain. |

MILTON O. HIRSHFIELD, *Primary Examiner.*

D. F. DUGGAN, *Assistant Examiner.*